(12) United States Patent (10) Patent No.: US 8,694,178 B2
Toki (45) Date of Patent: Apr. 8, 2014

(54) KEYLESS ENTRY DEVICE FOR VEHICLE

(75) Inventor: Iwao Toki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 128 days.

(21) Appl. No.: 13/483,855

(22) Filed: May 30, 2012

(65) Prior Publication Data

US 2012/0310447 A1   Dec. 6, 2012

(30) Foreign Application Priority Data

Jun. 1, 2011   (JP) ................. 2011-123063

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC ......... 701/2; 701/36; 340/425.5; 340/426.35; 340/426.36

(58) Field of Classification Search
USPC .......... 701/2, 36; 340/425.5, 426.35, 425.36, 340/426.1, 825.3, 825.31, 825.32, 825.34; 307/9.1, 10.5; 180/287
See application file for complete search history.

(56) References Cited

U.S. PATENT DOCUMENTS 5,299,194 A * 3/1994 Ichii et al. .................. 370/445
5,668,416 A    9/1997 Watanabe
6,144,294 A * 11/2000 Watanabe ............... 340/426.35

FOREIGN PATENT DOCUMENTS

JP    09-144411    6/1997
JP    2003-020834  1/2003

* cited by examiner

*Primary Examiner* — Rami Khatib
(74) *Attorney, Agent, or Firm* — Hunton & Williams LLP

(57) ABSTRACT

First, "Sync+Wakeup ID" is transmitted form a first vehicle (from a first time to a second time). While a first portable device paired with the first vehicle does not respond to this, when another second portable device has an inverted code coinciding by chance, the second portable device transmits a "Welcome" response (from the second time to a fifth time). During this response, a "Who" command including proper "Sync+Wakeup ID" and "command+additional data" is transmitted, thereby allowing the first portable device to normally respond to "Who" (a sixth time).

8 Claims, 8 Drawing Sheets

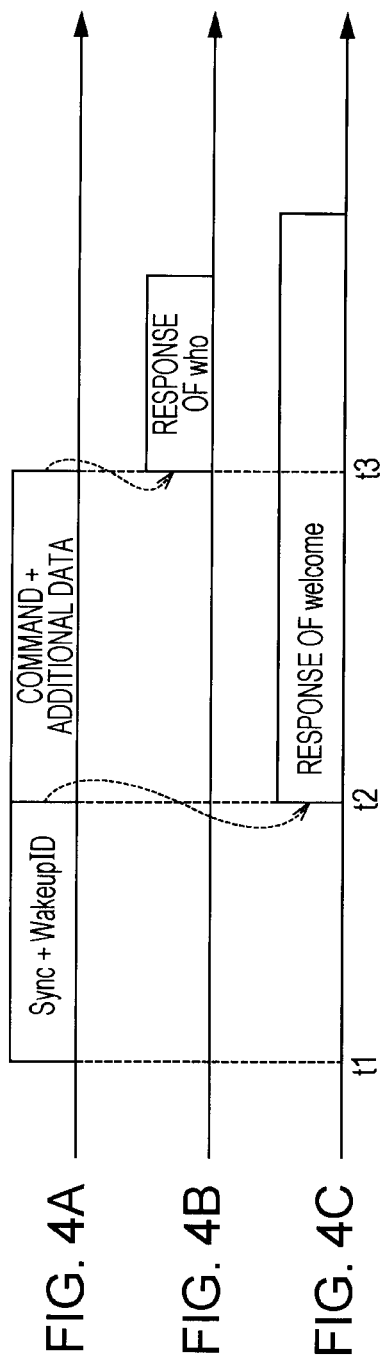

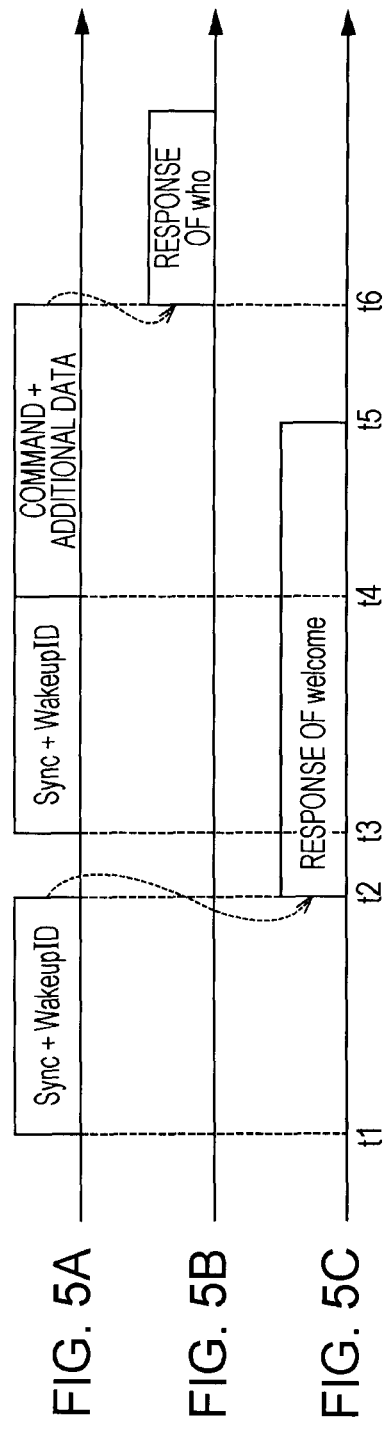

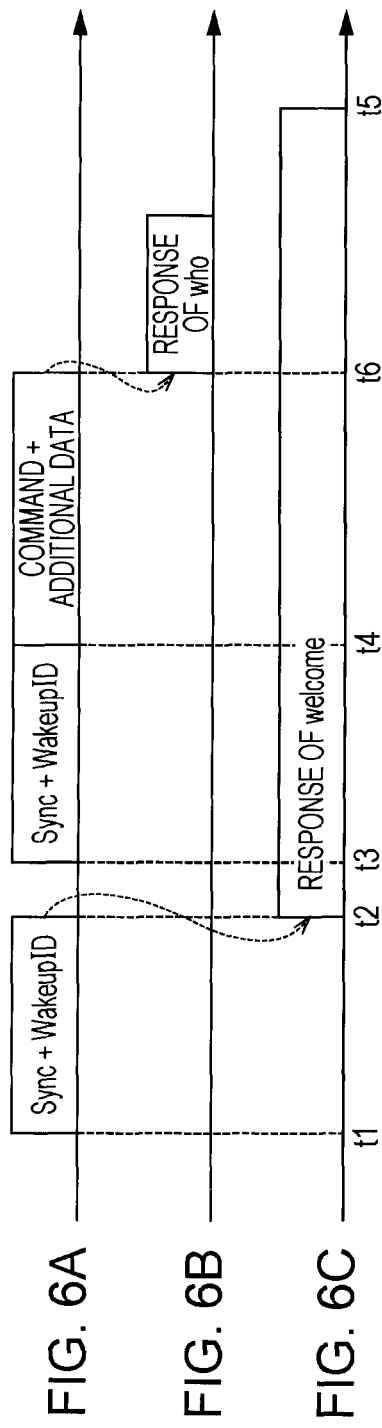

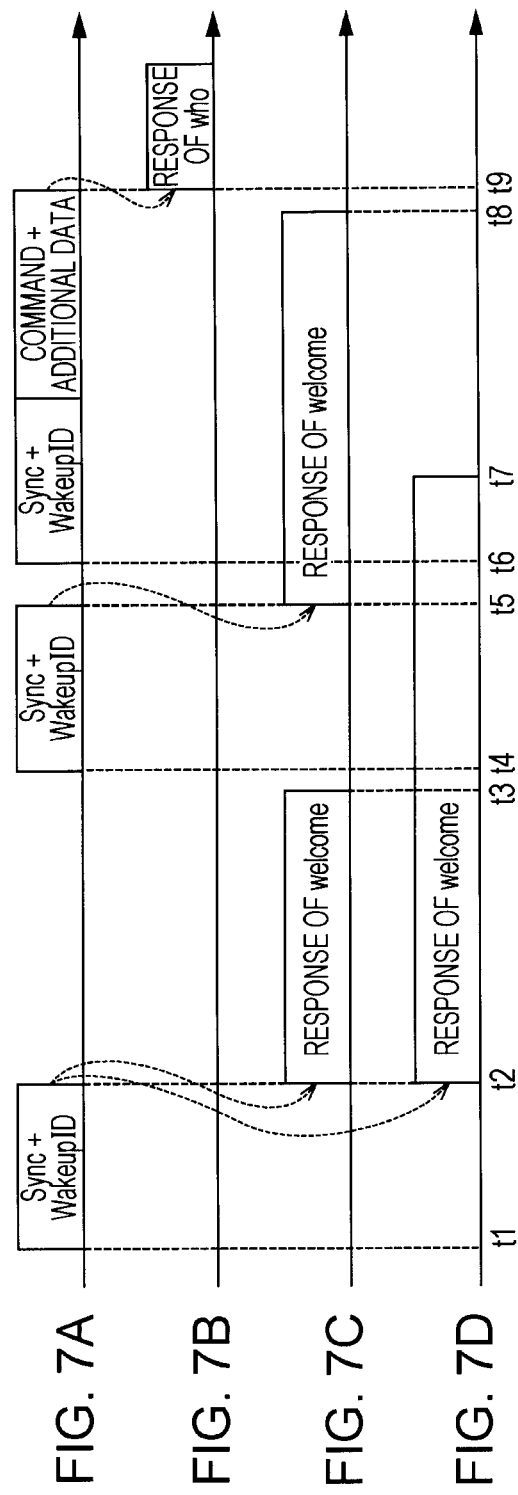

KEYLESS ENTRY DEVICE FOR VEHICLE

CLAIM OF PRIORITY

This application contains subject matter related to and claims the benefit of Japanese Patent Application No. 2011-123063 filed on Jun. 1, 2011, the entire contents which is incorporated herein by reference.

BACKGROUND OF THE DISCLOSURE

1. Field of the Disclosure

The present disclosure relates to a keyless entry device for a vehicle, which performs control of causing the equipment of the vehicle to operate, under the condition that authentication based on wireless communication that has been established between an on-vehicle device and a portable device a user possesses.

2. Description of the Related Art

An example of on on-vehicle device remote controller known as a smart key system has been disclosed in Japanese Unexamined Patent Application Publication No. 2009-68255. This on-vehicle device remote controller regularly transmits an activation signal by wireless (a regular transmission method) from an antenna on a vehicle side to a vehicle exterior area, and when mutual authentication has been established upon receiving a response from the portable device of a user, which has received that activation signal, the on-vehicle device remote controller controls an operation of unlocking a door in a locked state.

In particular, the above-mentioned related art focuses its attention on a point that when, in a situation where many vehicles equipped with remote controllers of the same type are parked, activation signals are transmitted with same timing from a plurality of vehicles adjacent to one another, signals are degraded owing to communication interference. Namely, in the relate art, an activation signal to be transmitted from an on-vehicle device is preliminarily set as a PN code (pseudo-noise sequence code), and a portable device corresponding to this is also caused to hold a PN code. Accordingly, even if communication interference has occurred, by calculating a correlation value between the PN code received by the portable device and the self-PN code, it is possible to realize the authentication of a legitimate user with a high probability.

Usually, an ID code unique to a vehicle is used for authentication between an on-vehicle device and a portable device, performed in a keyless entry device. The ID code unique to a vehicle is held in each of the on-vehicle device and the portable device, and hence it is possible for the on-vehicle device and the portable device to correctly recognize a correspondence relationship therebetween (mutual authentication).

In addition, it is necessary for the ID code to be unique to each of many vehicles, and so as to avoid overlap between a plurality of vehicles, the ID code is described with a certain amount of bit length (for example, 24 bits). In this regard, however, in the sequence of the mutual authentication, it is not necessary to use all 24 bits in a stage where an activation signal or the like is initially transmitted form an on-vehicle device to a portable device, and it is only necessary to use a portion of 24 bits. For example, if, from among all 24 bits of the ID code, the lower 8 bits thereof is only used for an ID abbreviated for activation, it is possible to reduce a communication time by a corresponding amount, and it may be considered that it is possible to improve the responsiveness of a system.

However, while a method in which an ID code is abbreviated and used for a trigger for activation or the like is useful in reducing a communication time, the method induces an unexpected failure to occur in some cases, according to circumstances. For example, it is assumed that an activation signal transmitted from an on-vehicle device to a portable device is used for a plurality of different purposes (used for unlocking a door, a welcome operation, and the like). When the portable device of a legitimate user exists in the neighborhood of a vehicle (within a communication area), an activation signal used for unlocking a door, from among these purposes, is a signal used for unlocking a door on the basis of a simple touch operation, for example. In addition, an activation signal used for the welcome operation is a signal used for causing lams and lights to be turned on or blink on and off and promoting the existence of the self-vehicle when the portable device of the legitimate user approaches the vehicle.

If an abbreviated ID is used for each of these plural purposes, while the ID codes do not coincide with one another as a whole, when abbreviated IDs are compared with one another, it is highly likely that overlaps occur between a plurality of vehicles. Therefore, for example, when a same user possesses a plurality of vehicles (for example, vehicles A and B), and approaches one vehicle A with having two portable devices A and B paired with the vehicles A and B, respectively, even if the ID codes of the vehicles A and B do not coincide with each other, an abbreviated ID used for unlocking in one vehicle A coincides with an abbreviated ID used for a welcome operation in the other vehicle B by chance, in some cases.

In this case, if an activation signal used for unlocking is transmitted from the vehicle A, since the portable device B, which has received the activation signal, recognizes that an activation signal used for a welcome operation has been transmitted from the vehicle B, a response signal turns out to be transmitted from the portable device B to the vehicle A that is properly supposed to not to be paired. Therefore, even if the portable device A normally transmits a response signal, a communication failure occurs owing to responses from the two portable devices A and B, and the operation of a system is likely to become unstable.

These and other drawbacks exist.

SUMMARY OF THE DISCLOSURE

In view of the above-mentioned situation, embodiments of the present disclosure provide a keyless entry device capable of preventing responses from a plurality of portable devices from colliding against one another, which may occur on a vehicle side in a specific situation, and ensuring a normal operation.

So as to solve the above-mentioned problem, the present disclosure provides a keyless entry device for a vehicle.

Namely, the keyless entry device for a vehicle of the present disclosure causes a pseudo call signal to be transmitted from an on-vehicle device, the pseudo call signal being configured without response instruction data being added to vehicle identification data. Here, the "pseudo call signal (for example, a dummy command)" is a signal transmitted before a proper "call instruction signal (for example, a "Who" command)" is transmitted from the on-vehicle device.

The proper "call instruction signal" is configured with predetermined response instruction data (for example, a command+additional data) being added to vehicle identification data (for example, a Wakeup ID) generated so as to derive from identification information (an ID code) unique to the vehicle. The "call instruction signal" is transmitted from the on-vehicle device at an interval of a predetermined waiting time after the above-mentioned "pseudo call signal" has been transmitted.

In addition, separately from the "call instruction signal", the keyless entry device for the vehicle causes a "welcome signal (for example, a "Welcome" command)" to be transmitted from the on-vehicle device. The "welcome signal" is configured using inverted vehicle identification data that derives from the identification information unique to the vehicle and has a relationship, in which the logical value of each digit thereof inverts from that of the vehicle identification data, with the vehicle identification data.

A portable device having received the above-mentioned "pseudo call signal (for example, a dummy command)" ignores the pseudo call signal when the notation of the vehicle identification data coincides with the notation of portable device identification data generated so as to derive from identification information unique to the self. On the other hand, the portable device interprets the "pseudo call signal" as the welcome signal in a pseudo manner and causes a "pseudo response signal (for example, the response of "Welcome" for the dummy)" to be transmitted from the portable device when the notation of the vehicle identification data coincides with the notation of inverted portable device data having a relationship, in which the logical value of each digit thereof inverts from that of the portable device identification data, with the portable device identification data.

In addition, a portable device having received the proper "call instruction signal (for example, a "Who" command)" transmits a "response signal (for example, the response signal of "Who")" for response instruction data when the notation of the vehicle identification data coincides with the notation of portable device identification data generated so as to derive from identification information unique to the self.

In addition, a portable device having received the "welcome signal (for example, a "Welcome" command)" transmits a "welcome response signal (for example, the response signal of proper "Welcome")" for the "welcome signal" when the notation of the inverted vehicle identification data coincides with the notation of portable device identification data generated so as to derive from identification information unique to the self.

According to the keyless entry device of the present disclosure, for example, when, with respect to one vehicle, there are a plurality of portable devices a user possesses, and the notation of a "call instruction signal (for example, a "who" command)" used in one portable device accidentally overlaps with the notation of a "welcome signal (for example, a "Welcome" command)" used in another portable device, it may be possible to avoid a communication failure in accordance with the following flow.

(1) First, the "pseudo call signal (for example, a dummy command)" is transmitted from the on-vehicle device, and hence the other portable device is caused to erroneously recognize that this is a "welcome signal (for example, a "Welcome" command)" for the self.

(2) Since the appearance of the "pseudo call signal (for example, a dummy command)" does not correspond to the "call instruction signal (for example, a "Who" command)", it may be possible for a proper portable device to treat this as meaningless.

(3) On the other hand, owing to the erroneous recognition, the other portable device transmits the "welcome response signal (for example, the response signal of "Welcome")".

(4) In addition, while the other portable device is transmitting the "welcome response signal (for example, the response signal of "Welcome")", the proper "call instruction signal (for example, a "Who" command)" is transmitted. Therefore, since the other portable device does not receive the proper "call instruction signal (for example, a "Who" command)" even if the proper "call instruction signal (for example, a "Who" command)" is transmitted, repeated erroneous recognition does not occur.

(5) Accordingly, a proper "response signal (for example, the response signal of "Who")" is transmitted from the proper portable device, and it may be possible to normally execute an operation as the keyless entry device.

(6) In addition, separately from the above-mentioned (1) to (5), when the proper portable device has received the "welcome signal (for example, a "Welcome" command)", it may be possible for the portable device to properly transmit the "welcome response signal (for example, the proper response signal of "Welcome")". Accordingly, it may be possible to normally execute an operation as the keyless entry device in the same way.

In the keyless entry device of the present disclosure, it is assumed that, with respect to a first vehicle and a second vehicle, to each of which one of first identification information and second identification information different from each other is unique, the notation of first vehicle identification data generated so as to derive from the first identification information has a relationship, in which the logical value of each digit thereof inverts from that of second vehicle identification data generated so as to derive from the second identification information, with the second vehicle identification data, and, with respect to a first portable device and a second portable device, paired with the first vehicle and the second vehicle, respectively, the first identification information is unique to the first portable device and the second identification information is unique to the second portable device.

In the above-mentioned case, it is assumed that the pseudo call signal, configured without the response instruction data being added to the first vehicle identification data, is transmitted from an on-vehicle device in the first vehicle. In addition, it may be possible to ignore the pseudo call signal on ground that the notation of the first vehicle identification data coincides with the notation of first portable device identification data generated so as to derive from the first identification information, when the pseudo call signal has been received by the first portable device. On the other hand, it may be possible to interpret the pseudo call signal as the welcome signal in a pseudo manner on ground that the notation of the first vehicle identification data coincides with the notation of second inverted portable device data having a relationship, in which the logical value of each digit thereof inverts from that of the first portable device identification data, with the first portable device identification data and it may be possible to transmit the pseudo response signal from the second portable device, when the pseudo call signal has been received by the second portable device. In addition, it is desirable that the call instruction signal is transmitted from the on-vehicle device in the first vehicle with regarding, as the waiting time, a time that elapses before at least transmission of the pseudo response signal is started by the second portable device, after the pseudo call signal has been transmitted from the on-vehicle device in the first vehicle.

According to the above-mentioned form, when the pseudo call signal is transmitted from the on-vehicle device in the first vehicle, while the proper first portable device to be paired ignores this, the second portable device not to be paired transmits the pseudo response signal in response to the pseudo call signal. In addition, since it may be possible for the on-vehicle device in the first vehicle to properly transmit the call instruction signal so as to be aimed at a gap in the response of the second portable device, it may be possible to reliably avoid a communication failure due to the erroneous recognition of the second portable device.

In addition, when the call instruction signal is transmitted, the call instruction signal is transmitted from the on-vehicle device in the first vehicle with regarding, as the waiting time, a time that elapses before the transmission of the pseudo response signal is terminated and after the transmission of the pseudo response signal has been started by the second portable device, after the pseudo call signal has been transmitted from the on-vehicle device in the first vehicle.

Accordingly, when the second portable device starts the transmission of the pseudo response signal with respect to the pseudo call signal, it may be possible to transmit the proper call instruction signal from the on-vehicle device in the first vehicle before the transmission of the pseudo response signal is terminated. Therefore, it may be possible to more reliably avoid a communication failure due to the erroneous recognition of the second portable device.

With respect to the transmission of the pseudo call signal, the next pseudo call signal may be transmitted from the on-vehicle device in the first vehicle at an interval of a waiting time that elapses before the initial transmission of the pseudo response signal due to the second portable device is completed, after the pseudo call signal has been initially transmitted from the on-vehicle device in the first vehicle. In addition, with respect to the transmission of the call instruction signal, the call instruction signal is transmitted from the on-vehicle device in the first vehicle with regarding, as the waiting time, a time that elapses before at least transmission of the next pseudo response signal for the next pseudo call signal is started by the second portable device, after each of the initial and next pseudo call signals has been transmitted from the on-vehicle device in the first vehicle.

According to the above-mentioned form, for example, even if a time taken for the transmission of the pseudo response signal varies depending on a portable device owing to a difference between communication processing capacities (transmission rates), it may be possible to properly transmit the call instruction signal in accordance with a portable device whose capacity is lower. Accordingly, it may be possible to improve practical convenience and provide a keyless entry device whose general versatility is high.

According to the keyless entry device for a vehicle of the embodiments of the present disclosure, while it is assumed that a specific situation occurs, it may still be possible to ensure the certainty and the normal operation of communication and greatly improve the reliability thereof.

BRIEF DESCRIPTION OF THE DRAWINGS

FIGS. 4A to 4C are examples of timing charts illustrating a relationship between transmission and reception, performed between an on-vehicle control module and a portable device in a comparative case example;

FIGS. 5A to 5C are examples of timing charts illustrating a relationship between transmission and reception, performed between an on-vehicle control module and a portable device in an exemplary embodiment;

FIGS. 6A to 6C are timing charts illustrating a relationship between transmission and reception, performed between an on-vehicle control module and a portable device in a comparative case example;

FIGS. 7A to 7D are examples of timing charts illustrating a relationship between transmission and reception, performed between an on-vehicle control module and a portable device in an exemplary embodiment of the disclosure.

DETAILED DESCRIPTION OF THE DISCLOSURE

Hereinafter, embodiments of the present disclosure will be described with reference to drawings. The following description is intended to convey a thorough understanding of the embodiments described by providing a number of specific embodiments and details involving a keyless entry device for a vehicle. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
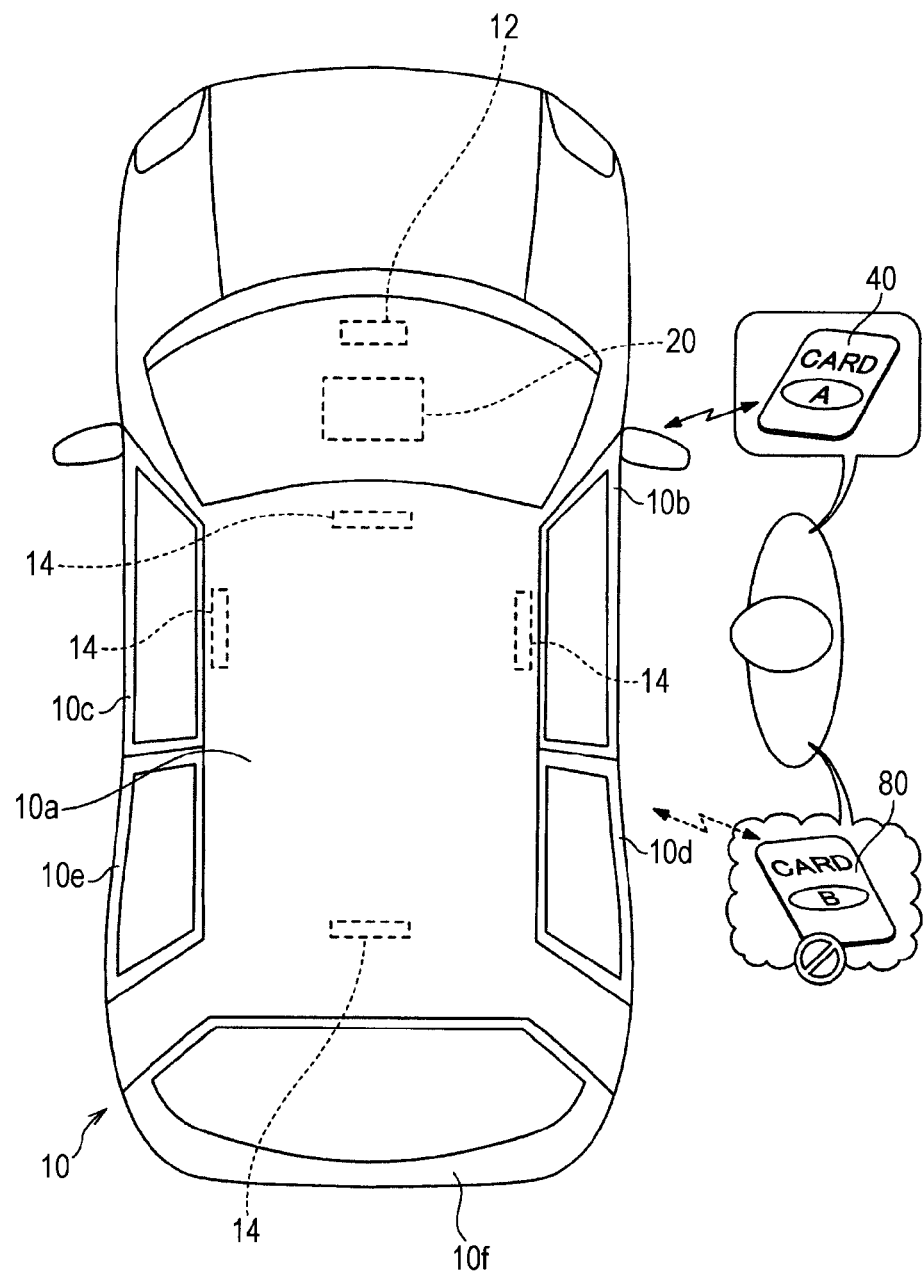
FIG. 1 is a diagram illustrating a schematic configuration of a keyless entry device of an exemplary embodiment of the disclosure.

FIG. 1 is a diagram illustrating the schematic configuration of a keyless entry device of an embodiment. For example, the keyless entry device may be built into a van-type vehicle 10, or any vehicle, and, include a reception antenna 12, a plurality of transmission antennas 14 are provided in various portions of the vehicle 10. In this example, not only one reception antenna 12 is installed within the instrument panel (identified with no reference symbol) of the vehicle 10, but also one transmission antenna 14 may be installed in a front portion within a roof panel 10a, two transmission antennas 14 may be installed on a driver side and a passenger side, respectively, and one transmission antenna 14 may be installed in a rear portion within the roof panel 10a, the total number of which is four. In other examples, more or less transmission antennas may be installed in various locations within a vehicle. The arrangement of various kinds of antennas 12 and 14, cited here, is an example, and another arrangement may also be adopted. For example, transmission antennas 14 may be embedded in right and left front doors 10b and 10c and a back door 10f (tail gate). Also, other transmission antennas 14 may be additionally embedded in right and left rear doors 10d and 10e, for example.

In addition, in the interior space of the vehicle 10, an on-vehicle control module 20 may be installed as the on-vehicle device of the keyless entry device, and the above-mentioned reception antennas 12 and transmission antennas 14 may be connected to the on-vehicle control module 20 through wiring lines not illustrated. A communication circuit (described later as a reception circuit 30 and a transmission circuit 32) on a vehicle side, not illustrated, may be built into the on-vehicle control module 20, and the communication circuit may have a function for establishing wireless communication with a portable device 40 a user possesses.

As described above, the keyless entry device may perform wireless communication between the communication circuit (on-vehicle device) on the vehicle side and the portable device 40, and may perform authentication using an ID code or the like. Accordingly, the keyless entry device may execute an operation (a so-called passive function, for example) for automatically locking a door or unlocking a door. In addition, when the portable device 40 having in common an ID code unique to the vehicle 10 approaches to within a communication area, the keyless entry device may also perform an operation (e.g., a welcome operation) for causing a room lamp, a turn-signal lamp, or the like to be turned on or blink on and off and promoting the existence of the vehicle 10 to the user. In addition to this, when the user (driver) possessing the portable device 40 enters the interior space of the vehicle, the keyless entry device may also allow to operate a main switch without a key being inserted into a key cylinder.

Figure 2:
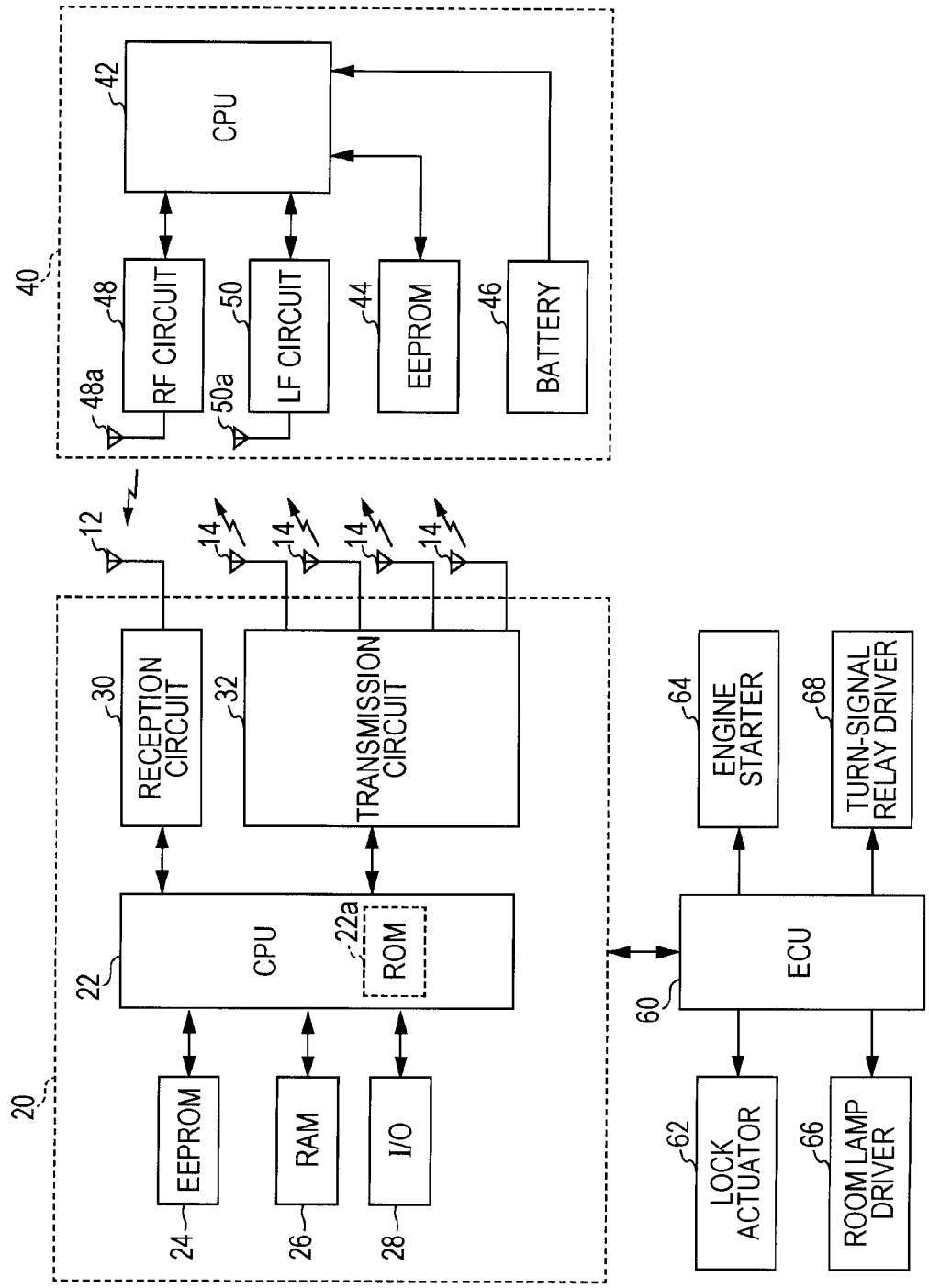
FIG. 2 is a block diagram schematically illustrating an electric configuration of a keyless entry device according to an exemplary embodiment of the disclosure.

FIG. 2 is a block diagram schematically illustrating the electric configuration of the keyless entry device. For example, the above-mentioned on-vehicle control module 20 may be configured as a computer including a CPU 22 serving as a central processor, memory devices such as an EEPROM 24, a RAM 26, and the like, and peripheral ICs such as an input/output driver (I/O) 28 and the like. Among these, the CPU 22 may read a control program stored in an embedded ROM 22a and may execute processing according to the instruction thereof, for example.

A control program for the operation of the keyless entry device may have been written into the ROM 22a embedded in the CPU 22. In addition, the ID code (identification information) unique to the individual vehicle 10 may have been written into the EEPROM 24. For example, the RAM 26 may be a volatile memory available as the main memory of the CPU 22, and the RAM 26 may also be embedded in the CPU 22 in the same way as the ROM 22a. In addition, the input/output driver 28 may be used for inputting and outputting various kinds of signals between the on-vehicle control module 20 and another electronic device.

In addition, the on-vehicle control module 20 may include the reception circuit 30 and the transmission circuit 32 as communication circuits on the vehicle side. The reception antenna 12 may be connected to the reception circuit 30 from among these, and the reception circuit 30 receives various kinds of response signals (the details thereof will be described later) wirelessly transmitted from the portable device 40, using the reception antenna 12. For example, the reception circuit 30 may decode an ID code included in the received signal, and may provide the CPU 22 with the value thereof (for example, 24-bit data).

The above-mentioned transmission antennas 14, the total number of which may be four, are connected to the transmission circuit 32. The transmission circuit 32 may operate on the basis of an instruction from the CPU 22, and may transmit, to the portable device 40, various kinds of signals (the details thereof will be described later) using the four transmission antennas 14. In addition, for example, a universal LF antenna may be used for each transmission antenna 14.

The portable device 40 may have a compact form the user easily holds, and examples of the form include a card-type form and a keyholder-type form. In addition to incorporating the CPU 42 and the EEPROM 44, the portable device 40 also may incorporate therein a battery 46 for driving, an RF circuit 48, and an LF circuit 50. A control program may be incorporated into the storage area (not illustrated) of the CPU 42, and in accordance with the instruction thereof, the CPU 42 may control the operation of the portable device 40 (e.g., transmission/reception based on the RF circuit 48 and the LF circuit 50).

In addition, an RF antenna 48a and an LF antenna 50a may be embedded in the portable device 40. The RF antenna 48a from among these may be connected to the RF circuit 48, and the LF antenna 50a may be connected to the LF circuit 50. The LF circuit 50 may include a function for receiving various kinds of signals transmitted from the vehicle 10 (transmission antenna 14) through the LF antenna 50a and demodulating these signals. In addition, the RF circuit 48 may include a function for transmitting various kinds of response signals from the RF antenna 48a.

An ID code unique to the vehicle 10 may be assigned to the portable device 40 as well. The ID code may be preliminarily written into the EEPROM 44, and the ID code may be paired with the ID code written into the EEPROM 24 in the vehicle 10. The CPU 42 may modulate the ID code read out from the EEPROM 44 and may output the modulation signal thereof to the RF circuit 48. In communication between the portable device 40 and the on-vehicle control module 20, these ID codes may be caused to be contained in the signal, thereby performing the authentication of the portable device 40 in the CPU 22 in the on-vehicle control module 20.

In addition, a form may be adopted in which a plurality of portable devices 40 may be prepared in one vehicle 10. In this case, a plurality of different unique ID codes, whose number may correspond to the number of the portable devices 40, may have been preliminarily registered in the EEPROM 24 on the vehicle 10 side, and a unique ID code may have been individually registered in the EEPROM 44 in each portable device 40. Accordingly, when the authentication of the portable device 40 is performed in the CPU 22 in the on-vehicle control module 20, it may be possible to authenticate, from the ID code, that the portable device 40 may be legitimate and discriminate an individual of the portable device 40.

The various kinds of signals transmitted from the transmission antenna 14 in the vehicle 10 may be received by the LF circuit 50 using the LF antenna 50a in such a way as described above. The LF circuit 50 may decode and supply the ID code, a command code, or the like, included in the signal, to the CPU 42. On the basis of the received ID code or command code, the CPU 42 may perform transmission processing for a response signal.

While not especially illustrated, an LED used for monitoring an operation may also be embedded in the portable device 40, for example. In this case, for example, when the battery 46 is weak or when the RF circuit 48 and the LF circuit 50 execute transmission/reception, it may be possible for the CPU 42 to perform the control of turning on the LED for monitoring.

In addition, in an embodiment, the on-vehicle control module 20 also may be connected to another control unit 60 (ECU). The control unit 60 may be a microcomputer including a CPU, an EEPROM, an RAM, an I/O, and the like, not illustrated, for example, and the control unit 60 may control locking a door and unlocking a door and may control the operation of the vehicle 10 (for example, engine starting and turning on lights and lams) in cooperation with the on-vehicle control module 20. Therefore, for example, in addition to a lock actuator 62 for a door and an engine starter 64, a room lamp driver 66, a turn-signal relay driver 68, and the like may be connected to the control unit 60. In addition, so as to perform a response operation (the generation of an operation sound or the like) in the vehicle 10 at the time of the actuation of the keyless entry device, a speaker driver (not illustrated) in the vehicle 10 may be connected to the control unit 60, for example.

For example, the lock actuator 62 may be a motor or solenoid actuating the loch or unlock mechanism of each of doors 10b to 10f in the vehicle 10. When an in-vehicle door handle or a lock pin, not illustrated, has been operated, the control unit 60 may actuate the lock actuator 62. In addition to this, when having received a keyless entry signal from the on-vehicle control module 20 in the keyless entry device, the control unit 60 also may perform control for actuating the lock actuator 62.

In addition, for example, the engine starter 64 may be a motor performing cranking of an engine. When a key switch not illustrated has been operated, the control unit 60 may actuate the engine starter 64. In addition to this, when having received a keyless start enable signal from the on-vehicle control module 20, the control unit 60 also may perform control for actuating the engine starter 64. In addition, when authentication utilizing the ID code has been established between the portable device 40 and the on-vehicle control module 20 and an engine start button or the like, not illustrated, has been pressed down by the user (driver), the keyless start enable signal may be output from the on-vehicle control module 20 to the control unit 60.

The room lamp driver 66 may be a driver circuit controlling turning on an interior lamp (light) not illustrated. In addition, the turn-signal relay driver 68 may be a driver circuit driving the relay of a turn-signal lamp (lamp) not illustrated. When the legitimate portable device 40 has approached the vehicle 10, the on-vehicle control module 20 may output an actuation signal to the control unit 60 under the condition that the authentication utilizing the ID code has been established between the portable device 40 and the on-vehicle control module 20. Upon receiving this, the control unit 60 may drive the room lamp driver 66 and the turn-signal relay driver 68, and may perform control (e.g., welcome operation) for causing the interior lamp and the turn-signal lamp to be turned on or blink on and off.

The former FIG. 1 illustrates a condition when the user has approached the vehicle 10 in a specific situation. Namely, a situation is assumed where, in addition to the vehicle 10, the user possesses a vehicle (may also possess more than one vehicle) not illustrated and each of the vehicles is equipped with the same type of keyless entry device. In a case where the user intends to get in the vehicle 10 in such a situation, when the user possesses only the portable device 40 whose unique ID code is paired with the vehicle 10, the user may have no trouble. However, when also having many opportunities to get in another vehicle, the user may have many occasions to routinely possess a plurality of portable devices 40 and 80 for convenience. In addition, the plural vehicles may be shared with a family, and may be shared in an entity such as a company, a shop, or the like.

In any case, when the user possessing the two portable devices 40 and 80 (more than two portable devices, in some cases) intends to get in the vehicle 10, it is presumed that only the portable device 40 whose ID code (identification information) legitimately coincides establishes communication for mutual authentication with the on-vehicle control module 20 and the other portable device 80 whose ID code does not coincide does not intervene in the communication.

Therefore, in the present embodiment, so as to avoid the ID codes (hereinafter, referred to as "Vehicle IDs") of a plurality of vehicles from overlapping with one another, a Vehicle ID is described using some amount of data (for example, 24-bit length). A description example of the Vehicle ID will be illustrated below.

(1) The Vehicle ID of the vehicle 10: AAAAAAh
(2) The Vehicle ID of the other vehicle: 555555h In the above-mentioned description example, it is understood that the Vehicle IDs of both of the vehicles are completely different from one another. In addition, (h) in each ID code indicates a hexadecimal notation.

In this regard, however, using all digits of the ID code for a signal (call instruction signal to the portable device 40) used for starting the mutual authentication leads to the redundancy of communication, and the serviceability of the keyless entry device may be easily harmed. Therefore, in the present embodiment, a mechanism may be adopted where an abbreviated ID (hereinafter referred to as "Wakeup ID") is used that is expressed by abbreviating the bit length thereof, compared with the above-mentioned Vehicle ID. Hereinafter, an example of the notation of the Wakeup ID will be illustrated.

(1) The Wakeup ID of the vehicle 10: AAh
(2) The Wakeup ID of the other vehicle: 55h In the above-mentioned example of the notation, with respect to the vehicle 10, the lower 8 bits, "AAh", of the Vehicle ID, "AAAAAAh", may be used for the Wakeup ID, and with respect to the other vehicle, the lower 8 bits, "55h", of the Vehicle ID, "555555h", may be used for the Wakeup ID. Therefore, it is understood that every one of the individual Wakeup IDs is unique data (vehicle identification data) generated so as to derive from the unique Vehicle ID and the individual Wakeup IDs are also different from each other in the notation of the Wakeup ID.

In addition, also with respect to the portable device 40, the lower 8 bits, "AAh", of the Vehicle ID, "AAAAAAh", may be used for the Wakeup ID in common with the vehicle 10, and with respect to the portable device 80 paired with the other vehicle, the lower 8 bits, "55h", of the Vehicle ID, "555555h", may be used for the Wakeup ID. Therefore, it is understood that every one of the individual Wakeups ID the portable devices 40 and 80 have is unique data (portable device identification data) generated so as to derive from the unique Vehicle ID and the individual Wakeup IDs are also different from each other in the notation of the Wakeup ID.

The above-mentioned Wakeup ID may be used for a call instruction signal used so that the vehicle 10 side searches the existence of the portable device 40 and instructs a response from the portable device 40. In the following description, for the sake of convenience, it is assumed that the call instruction signal is referred to as a "Who" command.

In addition, there may be a "Welcome" command (welcome signal) as a command transmitted from the vehicle 10 side and aimed at the portable device 40. The "Welcome" command may be used for controlling the above-mentioned welcome operation. The welcome operation may be an operation for promoting the existence of the vehicle 10 to the user by causing the interior lamp and the turn-signal lamp to be turned on or blink on and off when a person possessing the portable device 40 has approached the vehicle 10.

Using the bit-inverted value of the Wakeup ID, this "Welcome" command may be defined as a unique code (e.e., inverted vehicle identification data) generated so as to derive from the unique ID code. Hereinafter, an example of the notation of the bit-inverted value of the Wakeup ID will be illustrated below.

(1) The Wakeup ID (inverted value) of the vehicle 10: 55h
(2) The Wakeup ID (inverted value) of the other vehicle: AAh Also with respect to the Wakeup ID (inverted value) used for the "Welcome" command, in the same way, with respect to the portable device 40, "55h" may be used as the Wakeup ID (inverted value) in common with the vehicle 10, and with respect to the portable device 80 paired with the other vehicle, "AAh" is used as the Wakeup ID (inverted value). Therefore, the individual Wakeup IDs (inverted values) of the portable devices 40 and 80 also may be unique data (inverted portable device data) generated so as to derive from the unique Vehicle IDs and the individual Wakeup IDs are also different from each other in the notation of the Wakeup ID (inverted value).

A problem here may be that when the "Who" command has been transmitted from the vehicle 10, while the "AAh" of the Wakeup ID included therein is correctly determined by the portable device 40, the false recognition of the command occurs in the portable device 80 of the other vehicle owing to a probability that the "AAh" accidentally may coincide with a Wakeup ID (inverted value) used in the "Welcome" command. In this case, even if the portable device 40 responds to the "Who" command, since the portable device 80 erroneously causes the response of the "Welcome" to interrupt this, a failure may occur in the communication between the on-vehicle control module 20 and the portable device 40. Hereinafter, this point will be described in detail.

Figure 3A:
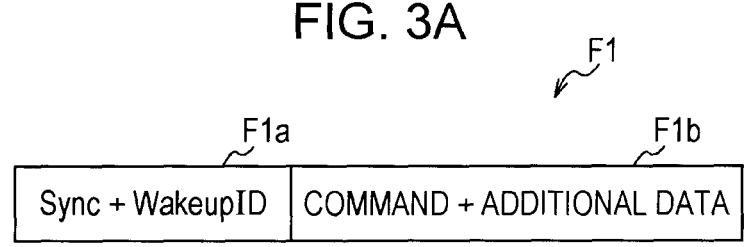
FIGS. 3A and 3B are schematic diagrams illustrating examples of frame structures of a "Who" command and a "Welcome" command.
Figure 3B:
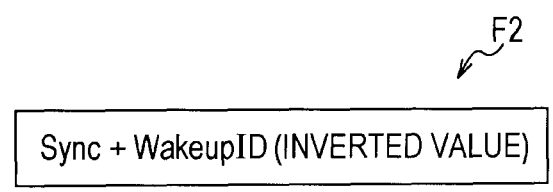

FIGS. 3A and 3B are schematic diagrams illustrating examples of the frame structures of the "Who" command and the "Welcome" command.

First, as illustrated in FIG. 3A, the transmission frame F1 of the "Who" command may include a frame structure in which a subsequent-stage area F1b may be concatenated with a preceding-stage area F1a. In the preceding-stage area F1a from among these, the data sequence of "Sync+Wakeup ID" may be stored, for example, and in the subsequent-stage area F1b, the data sequence of "command+additional data" may be stored. For example, the "command+additional data" may be a content (function code) for providing a response instruction to the portable device 40.

Next, as illustrated in FIG. 3B, the transmission frame F2 of the "Welcome" command may have a frame structure whose length is shorter than the transmission frame F1 of the "Who" command. Namely, the area of the "command+additional data" is not added to the "Welcome" command, and the "Welcome" command is configured using the data sequence of "Sync+Wakeup ID (inverted value)". So as to improve responsiveness, the "Welcome" command may be defined as a content for providing a response instruction to the portable device 40 only using a simple frame configuration.

FIGS. 4A to 4C are examples of timing charts illustrating a relationship between transmission and reception, performed between the on-vehicle control module 20 and the portable devices 40 and 80, as a first comparative case example to be contrasted with the present embodiment.

FIG. 4A: When it is assumed that the vehicle 10 the user intends to get in now is a "first vehicle", the "Who" command may be transmitted from this "first vehicle" as necessary, for example, at the time of unlocking or the like. Here, an example is illustrated in which the transmission of the "Who" command is started at a given time t1.

FIG. 4B: When it is assumed that the portable device 40 paired with the "first vehicle" is a "first portable device", the "first portable device" may recognize, for times t1 to t2, that the preceding-stage area, "Sync+Wakeup ID", of the "Who" command coincides with a unique code ("AAh" corresponding to the lower 8 bits) deriving from the ID code of the self. In addition, when having received the "command+additional data" for subsequent times t2 to t3, the "first portable device" may transmit a response signal for "Who" from a time t3.

FIG. 4C: While not especially illustrated, it is assumed the vehicle different from the vehicle 10 is a "second vehicle" and the portable device 80 paired with the "second vehicle" is a "second portable device". The "second portable device" may recognize, for times t1 to t2, that the preceding-stage area, "Sync+Wakeup ID", of the "Who" command coincides with the inverted value of a unique code (the inverted value, "AAh", corresponding to the lower 8 bits) deriving from the ID code of the self. In this case, the "second portable device" may recognize to have received the "Welcome" command for itself, and may transmit a response signal for "Welcome" from the time t2.

The response signal of the "Welcome" may be more redundant than the response signal of the "Who", and the transmission thereof may continue after the time t3. In this case, even if the "first portable device" transmits the legitimate response signal of the "Who", the legitimate response signal of the "Who" may be crushed by the response signal of the "Welcome", thereby causing a communication failure to occur. As a result, even if the user possesses the legitimate portable device 40, the user may fail in unlocking a door in the vehicle 10.

Therefore, in the present embodiment, so as to avoid the communication failure occurring in the above-mentioned first comparative case example, a following first embodiment will be provided.

FIGS. 5A to 5C are exemplary timing charts illustrating a relationship between transmission and reception, performed between the on-vehicle control module 20 and the portable devices 40 and 80 in an exemplary embodiment. Hereinafter, it will be assumed that FIG. 5A corresponds to a transmission timing due to the "first vehicle", FIG. 5B corresponds to a transmission timing due to the "first portable device", and FIG. 5C corresponds to a transmission timing due to the "second portable device", and FIGS. 5A to 5C will be described in chronological order.

Times t1 to t2: The "first vehicle" may transmit the "Sync+Wakeup ID" for given times t1 to t2. This may be a data sequence only corresponding to the preceding-stage area of the proper "Who" command, and has a meaning as a dummy "Who" command (e.g., pseudo call signal).

Time t2: As described above, since the preceding-stage portion of the "Who" command seems like the "Welcome" command for the "second portable device", the "second portable device" may start transmitting the response signal of the "Welcome", from the time t2.

Time t3: At an interval of a waiting time from the time t2 to the time t3, the "first vehicle" may start transmitting the proper "Who" command from the time t3. On the control logic of the on-vehicle control module 20, the time t3 may be set to a timing after the "second portable device" has started transmitting the response signal of the "Welcome". The "second portable device" may be still responding to the "Welcome" at this timing, and even if new "Sync+Wakeup ID" is transmitted, the "second portable device" does not respond to this.

On the other hand, since, for the "first portable device", no subsequent-stage portion is transmitted after the time t2, it may be possible for the "first portable device" to recognize the previous "Sync+Wakeup ID" as an abnormal data sequence and ignore this.

Time t4: Subsequent to the preceding-stage portion of the "Who" command, the subsequent-stage portion thereof may continue to be transmitted. Even at this timing, the "second portable device" may be still responding to the "Welcome".

Time t5: The transmission of the response signal of the "Welcome" from the "second portable device" may be terminated. At this timing, the subsequent-stage portion of the "Who" command may continue to be transmitted from the "first vehicle".

Time t6: Since receiving the "command+additional data" subsequent to the preceding-stage area, "Sync+Wakeup ID", of the "Who" command, the "first portable device" may transmit a response signal for the "Who" from a time t6.

Since the transmission of the response signal of the "Welcome" due to the "second portable device" has been already terminated at this timing, it may be possible for the "first vehicle" to normally receive the response signal of the "Who". As a result, the vehicle 10 may succeed in unlocking a door, and it may be possible to ensure a normal operation as a keyless entry device.

As described above, a procedure may be adopted in which the dummy command and the "Who" command are transmitted from the "first vehicle", as one set.

(1) Namely, before the transmission of the proper "Who" command, the "first vehicle" may transmit the dummy command. Accordingly, while causing the "second portable device" to erroneously transmit the response signal of the "Welcome", the "first vehicle" may transmit the proper "Who" command aimed at the timing of the continued erroneous transmission thereof.

(2) With respect to a timing at which the "Who" command is transmitted, a time t3 may be set during the response of the "Welcome" due to the "second portable device" (the time t2<the time t3). Accordingly, it may be hard for the "second portable device" to respond to the "Who" command after the dummy command.

(3) In addition, before the time t6 when the transmission of the "Who" command is completed, a timing may be set when the response of the "Welcome", performed by the "second portable device", may be completed (the time t5<the time t6).

According to the above-mentioned method of the first embodiment, it may be possible for the "first vehicle" to transmit the "Who" command to the "first portable device" to be properly paired with the "first vehicle", and the response signal of the "Who" is normally transmitted from the "first portable device". Therefore, the "first vehicle" may not be disturbed by the response of the "Welcome" from the "second portable device" in such a way as in the first comparative case example.

Next, FIGS. 6A to 6C are examples of timing charts illustrating a relationship between transmission and reception, performed between the on-vehicle control module 20 and the portable devices 40 and 80 in a second comparative case example. This second comparative case example corresponds to a case example where even if the above-mentioned first embodiment is applied, it still may be hard to fully exclude a communication failure in a specific situation. Hereinafter, the second comparative case example will be specifically described.

When the second comparative case example illustrated in FIGS. 6A to 6C is compared with the first embodiment illustrated in FIGS. 5A to 5C, the response of the "Welcome", transmitted from the "second portable device", may become prolonged in the second comparative case example, and the time t6<the time t5 may be satisfied without the above-mentioned (3) being satisfied. Namely, compared with the first embodiment illustrated in FIGS. 5A to 5C, it may take a long time for the "second portable device" to respond to the "Welcome", and it is understood that the transmission of the "Who" command has been completed (the time t6) before the completion of the response (the time t5).

In this case, while the "first portable device" may respond to the "Who" command at the time t6, the "first vehicle" may continue to receive the response of the "Welcome" from the "second portable device" at this timing, and the response signal of the "Who" is crashed. Therefore, it may be hard to receive the response signal of the "Who". As a result, in the same way, the "first vehicle" may fail in unlocking a door (in the same way as the time t3 in FIG. 4C).

As a reason why it takes a long time for the "second portable device" to respond to the "Welcome" in such a way as in the second comparative case example, the low processing capacity (transmission rate) thereof may be cited. Examples of the portable devices 40 and 80 may include a smart key with a built-in intelligent tuner and a smart key with a built-in normal tuner, and the processing capacity of the latter may be inferior to the processing capacity of the former. Therefore, if the "second portable device" is intrinsically equipped with the intelligent tuner, the transmission of the "Who" command may have been completed (the time t6) after the completion of the response of the "Welcome" (the time t5). However, since the "second portable device" is equipped with the normal tuner, the transmission of the "Who" command is likely to have been completed (the time t6) before the completion of the response of the "Welcome" (the time t5). As a result, the "first vehicle" may fail in unlocking a door.

Even in this case, if a form is adopted where a timing (the time t3) from which the "Who" command is transmitted from the "first vehicle" is delayed compared with the first embodiment, thereby causing the transmission of the "Who" command to be completed (the time t6) after the completion of the response of the "Welcome" (the time t5), there may be no problem. However, since, in an actual situation of usage, it is hard to judge whether or not the portable devices 40 and 80 are equipped with the intelligent tuners or the normal tuners, it is hard for the "first vehicle" to flexibly change a timing (the time t3) from which the "Who" command may be transmitted, after having transmitted the dummy command. FIGS. 7A to 7D are examples of timing charts illustrating a relationship between transmission and reception, performed between the on-vehicle control module 20 and three portable devices 40, 80, and 81 in an exemplary embodiment. In such an embodiment, it is assumed that the two portable devices 80 and 81 (or more than two portable devices) paired with the other vehicle exist and two tuner types exist in these two portable devices 80 and 81. In addition, it is assumed that the portable device 80 equipped with the above-mentioned intelligent tuner is the "second portable device" and the portable device 81 equipped with the normal tuner is a "third portable device". Accordingly, it is assumed that the second embodiment is effective for at least one of (1) a situation where the user simultaneously possesses the portable device 80 equipped with the intelligent tuner in addition to the portable device 40 and (2) a situation where the user simultaneously possesses the portable device 81 equipped with the normal tuner in addition to the portable device 40. In addition, the portable device 81 corresponds to a portable device the user possesses separately from the portable device 80 illustrated in FIG. 1.

In addition, hereinafter, it will be assumed that FIG. 7A corresponds to a transmission timing due to the "first vehicle", FIG. 7B corresponds to a transmission timing due to the "first portable device", FIG. 7C corresponds to a transmission timing due to the "second portable device", and FIG. 7D corresponds to a transmission timing due to the "third portable device".

Time t1: First, the "first vehicle" may transmit an initial dummy command. The initial dummy command also may be the "Sync+Wakeup ID" in the same way as described above.

Time t2: The initial dummy command may be received by the "second portable device" or the "third portable device" (also, both thereof) in addition to the "first portable device" the user possesses. In this regard, however, since, at the timing of the time t2, the dummy command may appear like the "Welcome" command to the "second portable device" and the "third portable device", the "second portable device" and the "third portable device" may individually start the response of the "Welcome". In addition, at this time, since being not normal data for the "first portable device" and not interpreted to imply some meaning, the initial dummy command may be ignored by the "first portable device".

Time t3: Here, the transmission of the response of the "Welcome", performed by the "second portable device", may be completed first. Since being a type equipped with the intelligent tuner, the "second portable device" may have a high processing capacity (transmission rate) compared with the "third portable device", thereby being capable of terminating the transmission early.

Time t4: Regarding, as a quiescent time, a time elapsing before the response of the "Welcome" due to the "second portable device" may be completed (after the time t3), the "first vehicle" transmits a next dummy command. The next dummy command also may be the "Sync+Wakeup ID" in the same way as the initial dummy command. If the "first vehicle" transmits the "Who" command at this timing, the "third portable device" may not especially respond to (e.g., it is difficult for the "third portable device" to respond to) this "Who" command but the "second portable device" erroneously may respond in the same pattern as that of the first comparative case example. Accordingly, by transmitting the dummy command again from this time, the "first vehicle" may induce the "second portable device" to erroneously respond again.

Time t5: With respect to the next dummy command transmitted from the "first vehicle", only the "second portable device" may respond to the "Welcome" at this timing. Namely, since continuing to respond to the "Welcome" with respect to the initial dummy command, the "third portable device" may not respond (it is hard for the "third portable device" to respond) to the next dummy command. In addition, here, the next dummy command also may not be normal data for the "first portable device", and may be ignored in the same way as described above.

Time t6: After the time t5 (every one of the "second portable device" and the "third portable device" may continue to respond to the "Welcome"), the "first vehicle" may transmit the proper "Who" command. When the "Who" command may be transmitted at this timing, since every one of the "second portable device" and the "third portable device" may continue to respond to the "Welcome", both thereof do not erroneously respond (it is hard for both thereof to erroneously respond) to the "Who" command. Namely, at the time t6, even if being any one of a type equipped with the intelligent tuner and a type equipped with the normal tuner, the different portable devices 80 and 81 may not erroneously respond to the "Who" command.

Time t7: Here, the response of the "Welcome", performed by the "third portable device" with respect to the initial dummy command, may be finally terminated.

Time t8: The response of the "Welcome", performed by the "second portable device" with respect to the next dummy command, may be terminated.

Time t9: When the transmission of the "Who" command from the "first vehicle" has been completed, the "first portable device" normally may respond to the "Who" command. After that, through the above-mentioned mutual authentication, it may be possible to unlock a door in the "first vehicle (vehicle 10)".

As described above, the "Who" commands following the initial and next (second) dummy commands may be transmitted, as one set, from the "first vehicle" as necessary. Accordingly, even if the user possesses the portable devices 40, 80, and 81 based on any one of a type equipped with the intelligent tuner and a type equipped with the normal tuner, it may be possible to deal with the portable devices 40, 80, and 81 in accordance with the second embodiment.

In addition, in the second embodiment, it may not be necessary for the "second portable device" and the "third portable device" to be simultaneously possessed in addition to the "first portable device" (it is not necessary for the three portable devices to be simultaneously possessed), and the second embodiment may be available for a situation where one of the "second portable device" and the "third portable device" only may be possessed along with the "first portable device".

Figure 8:
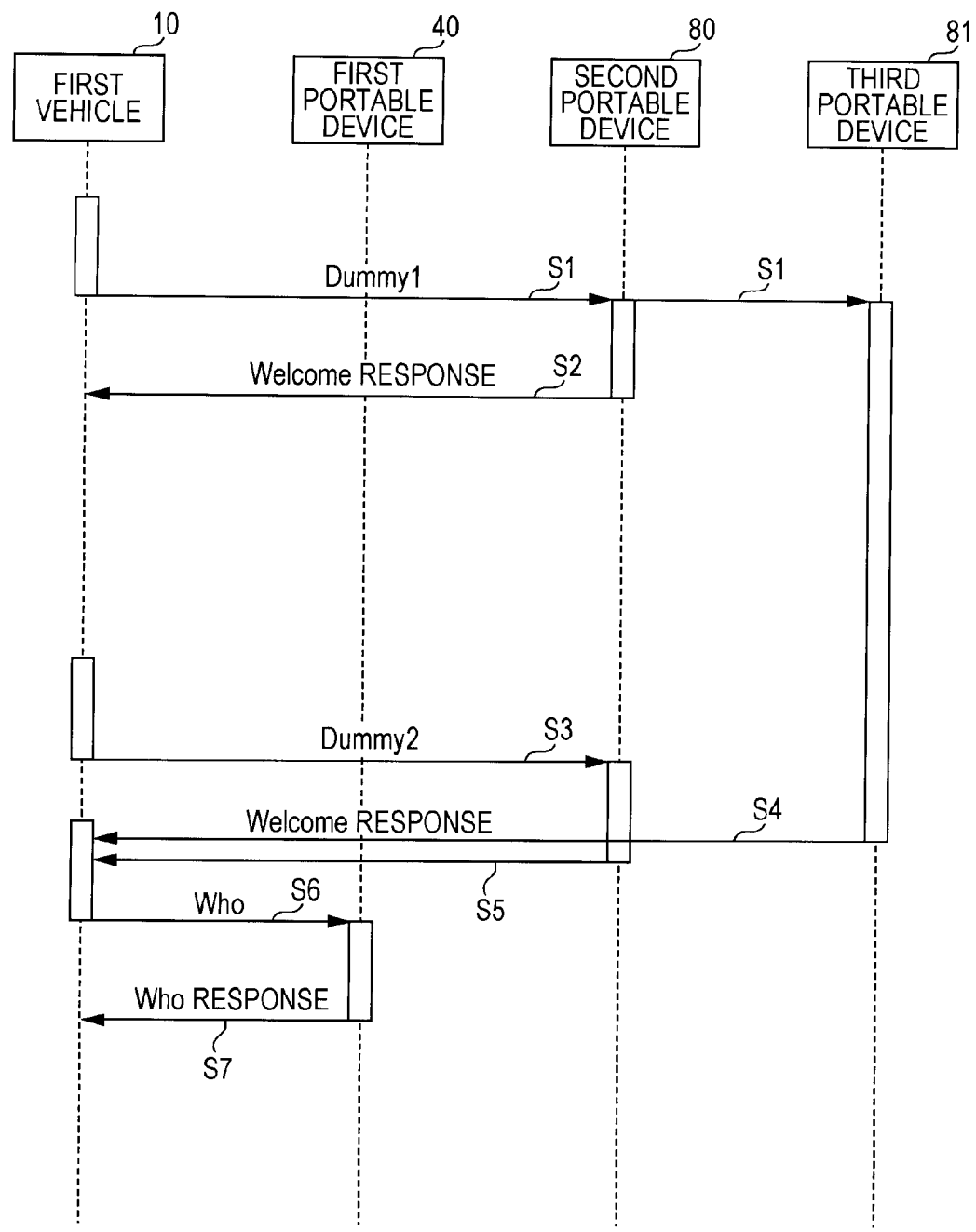
FIG. 8 is an operation sequence diagram corresponding to the an exemplary embodiment.

FIG. 8 is an operation sequence diagram corresponding to an exemplary embodiment. While an operation sequence in this embodiment corresponds to the timing chart illustrated in FIGS. 7A to 7D, the operation sequence will be described so as to be confirmed, using the form of the sequence diagram here.

Step S1: The "first vehicle (vehicle 10)" may transmit the initial dummy command (Dummy 1). While being ignored by the "first portable device (portable device 40)" the user possesses, the initial dummy command may appear like the "Welcome" command to the "second portable device (portable device 80)" and the "third portable device (portable device 81)". Therefore, each of the "second portable device (portable device 80)" and the "third portable device (portable device 81)" may start the response of the "Welcome".

Step S2: the "second portable device (portable device 80)" equipped with the intelligent tuner may complete the response of the "Welcome" first.

Step S3: Regarding, as a quiescent time, a time elapsing before the response of the "Welcome" due to the "second portable device (portable device 80)" is completed, the "first vehicle (vehicle 10)" transmits the next dummy command (Dummy 2). Upon receiving this, the "second portable device (portable device 80)" may start the response of the "Welcome" again. In addition, in the same way, the "first portable device (portable device 40)" may ignore this.

Steps S4 and S5: After this, the transmission operations of the responses of the "Welcome", performed by the "third portable device (portable device 81)" and the "second portable device (portable device 80)", may be terminated in succession.

Step S6: Before the previous Steps S4 and S5, the "first vehicle (vehicle 10)" may have started the transmission of the proper "Who" command. Since continuing to respond to the "Welcome", the "third portable device (portable device 81)" and the "second portable device (portable device 80)" may not erroneously respond to this "Who" command.

Step S7: The "Who" command from the "first vehicle (vehicle 10)" normally may be received by the "first portable device (portable device 40)". Accordingly, the "first portable device (portable device 40)" may respond to the "Who" command. After this, through the above-mentioned mutual authentication, a door may be unlocked (not illustrated).

As described above, according to the above-mentioned keyless entry device of one embodiment, even if there is a situation where a command coincides by chance as a different command between vehicles between which the notations of data (Sync+Wakeup ID) used for authentication are different from each other, it may be possible to avoid a communication failure and certainly execute an operation as the keyless entry device.

In addition, even in a situation where tuner types whose processing capacities are different from each other are mixed in a plurality of portable devices, it may be possible to complete a series of communication sequences without discriminating any tuner type. Therefore, it may not be necessary to especially provide a sequence for detecting a tuner type or trying a communication test, and it may be possible to complete mutual authentication with a shorter time. Accordingly, it may be possible to further improve the responsiveness of the keyless entry device.

In addition, while, in one embodiment, a case may be cited where the response signals of the "Welcome" are transmitted from the portable devices 80, 81, and the like paired with the vehicle different from the vehicle 10, when the proper "Welcome" command has been transmitted from the vehicle 10, the portable device 40 having normally received this transmits the response signal of the proper "Welcome". In addition, the on-vehicle control module 20 in the vehicle 10 may instruct the control unit 60 to perform the welcome operation, under the condition that mutual authentication has been established, and upon receiving this, the control unit 60 may activate the room lamp driver 66 and the turn-signal relay driver 68.

Embodiments of the present disclosure may be variously deformed and implemented without being limited to one embodiment described above. The ID code and the Wakeup ID, cited in one embodiment, are examples, and another value may be used for the ID code.

While the lower 8 bits of the ID code is defined as the Wakeup ID in one embodiment, the allocation of upper bits may be used for the Wakeup ID.

In addition, while, in one embodiment, a hardware configuration where the on-vehicle control module 20 and the control unit 60 may be separated from each other is cited as an example, a configuration may be used where the functions thereof are consolidated into one piece of hardware.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A keyless entry device for a vehicle, which performs control of causing a piece of equipment of the vehicle to operate, under the condition that mutual authentication based on contactless communication has been established between an on-vehicle device installed in the vehicle and a portable device possessed by a user, using identification information common to individuals of the on-vehicle device and the portable device, the keyless entry device comprising:
    pseudo call signal transmission means configured to cause a pseudo call signal to be transmitted from the on-vehicle device, the pseudo call signal being configured without predetermined response instruction data being added to vehicle identification data generated so as to derive from identification information unique to the vehicle, before a call instruction signal configured with the response instruction data being added to the vehicle identification data is transmitted from the on-vehicle device;
    call instruction signal transmission means configured to cause the call instruction signal to be transmitted from the on-vehicle device at an interval of a predetermined waiting time after the pseudo call signal has been transmitted;
    welcome signal transmission means configured to cause a welcome signal to be transmitted from the on-vehicle device, the welcome signal being configured using inverted vehicle identification data that derives from the identification information unique to the vehicle and has a relationship, in which a logical value of each digit thereof inverts from that of the vehicle identification data, with the vehicle identification data;
    pseudo response signal transmission means configured to ignore the pseudo call signal when, in a portable device having received the pseudo call signal, a notation of the vehicle identification data coincides with a notation of portable device identification data generated so as to derive from identification information unique to the self while interpreting the pseudo call signal as the welcome signal in a pseudo manner and causing a pseudo response signal to be transmitted from the portable device when the notation of the vehicle identification data coincides with a notation of inverted portable device data having a relationship, in which a logical value of each digit thereof inverts from that of the portable device identification data, with the portable device identification data;
    response signal transmission means configured to cause a response signal for the response instruction data to be transmitted from a portable device when, in the portable device having received the call instruction signal, the notation of the vehicle identification data coincides with a notation of portable device identification data generated so as to derive from identification information unique to the self; and
    welcome response signal transmission means configured to cause a welcome response signal for the welcome signal to be transmitted from a portable device when, in the portable device having received the welcome signal, a notation of the inverted vehicle identification data coincides with a notation of portable device identification data generated so as to derive from identification information unique to the self.

2. The keyless entry device for a vehicle according to claim 1, wherein
    when with respect to a first vehicle and a second vehicle, to each of which one of first identification information and second identification information different from each other is unique, a notation of first vehicle identification data generated so as to derive from the first identification information has a relationship, in which a logical value of each digit thereof inverts from that of second vehicle identification data generated so as to derive from the second identification information, with the second vehicle identification data, and
    with respect to a first portable device and a second portable device, paired with the first vehicle and the second vehicle, respectively, the first identification information is unique to the first portable device and the second identification information is unique to the second portable device,
    the pseudo call signal transmission means
    causes the pseudo call signal, configured without the response instruction data being added to the first vehicle identification data, to be transmitted from an on-vehicle device in the first vehicle, the pseudo response signal transmission means
ignores the pseudo call signal on ground that the notation of the first vehicle identification data coincides with a notation of first portable device identification data generated so as to derive from the first identification information, when the pseudo call signal has been received by the first portable device,
while interpreting the pseudo call signal as the welcome signal in a pseudo manner on ground that the notation of the first vehicle identification data coincides with a notation of second inverted portable device data having a relationship, in which a logical value of each digit thereof inverts from that of the first portable device identification data, with the first portable device identification data and causing the pseudo response signal to be transmitted from the second portable device, when the pseudo call signal has been received by the second portable device, and
the call instruction signal transmission means
causes the call instruction signal to be transmitted from the on-vehicle device in the first vehicle with regarding, as the waiting time, a time that elapses before at least transmission of the pseudo response signal is started by the second portable device, after the pseudo call signal has been transmitted from the on-vehicle device in the first vehicle.

3. The keyless entry device for a vehicle according to claim 2, wherein
the call instruction signal transmission means
causes the call instruction signal to be transmitted from the on-vehicle device in the first vehicle with regarding, as the waiting time, a time that elapses before the transmission of the pseudo response signal is terminated and after the transmission of the pseudo response signal has been started by the second portable device, after the pseudo call signal has been transmitted from the on-vehicle device in the first vehicle.

4. The keyless entry device for a vehicle according to claim 2, wherein
the pseudo call signal transmission means
causes the next pseudo call signal to be transmitted from the on-vehicle device in the first vehicle at an interval of a waiting time that elapses before initial transmission of the pseudo response signal due to the second portable device is completed, after the pseudo call signal has been initially transmitted from the on-vehicle device in the first vehicle, and
the call instruction signal transmission means
causes the call instruction signal to be transmitted from the on-vehicle device in the first vehicle with regarding, as the waiting time, a time that elapses before at least transmission of the next pseudo response signal for the next pseudo call signal is started by the second portable device, after each of the initial and next pseudo call signals has been transmitted from the on-vehicle device in the first vehicle.

5. A keyless entry device for a vehicle, which performs control of causing a piece of equipment of the vehicle to operate, under the condition that mutual authentication based on contactless communication has been established between an on-vehicle device installed in the vehicle and a portable device possessed by a user, using identification information common to individuals of the on-vehicle device and the portable device, the keyless entry device comprising:
pseudo call signal transmitter that causes a pseudo call signal to be transmitted from the on-vehicle device, the pseudo call signal being configured without predetermined response instruction data being added to vehicle identification data generated so as to derive from identification information unique to the vehicle, before a call instruction signal configured with the response instruction data being added to the vehicle identification data is transmitted from the on-vehicle device;
call instruction signal transmitter that causes the call instruction signal to be transmitted from the on-vehicle device at an interval of a predetermined waiting time after the pseudo call signal has been transmitted;
welcome signal transmitter that causes a welcome signal to be transmitted from the on-vehicle device, the welcome signal being configured using inverted vehicle identification data that derives from the identification information unique to the vehicle and has a relationship, in which a logical value of each digit thereof inverts from that of the vehicle identification data, with the vehicle identification data;
pseudo response signal transmitter that ignores the pseudo call signal when, in a portable device having received the pseudo call signal, a notation of the vehicle identification data coincides with a notation of portable device identification data generated so as to derive from identification information unique to the self while interpreting the pseudo call signal as the welcome signal in a pseudo manner and causing a pseudo response signal to be transmitted from the portable device when the notation of the vehicle identification data coincides with a notation of inverted portable device data having a relationship, in which a logical value of each digit thereof inverts from that of the portable device identification data, with the portable device identification data;
response signal transmitter that causes a response signal for the response instruction data to be transmitted from a portable device when, in the portable device having received the call instruction signal, the notation of the vehicle identification data coincides with a notation of portable device identification data generated so as to derive from identification information unique to the self; and
welcome response signal transmitter that causes a welcome response signal for the welcome signal to be transmitted from a portable device when, in the portable device having received the welcome signal, a notation of the inverted vehicle identification data coincides with a notation of portable device identification data generated so as to derive from identification information unique to the self.

6. The keyless entry device for a vehicle according to claim 5, wherein
when, with respect to a first vehicle and a second vehicle, to each of which one of first identification information and second identification information different from each other is unique, a notation of first vehicle identification data generated so as to derive from the first identification information has a relationship, in which a logical value of each digit thereof inverts from that of second vehicle identification data generated so as to derive from the second identification information, with the second vehicle identification data, and
with respect to a first portable device and a second portable device, paired with the first vehicle and the second vehicle, respectively, the first identification information is unique to the first portable device and the second identification information is unique to the second portable device, the pseudo call signal transmitter causes the pseudo call signal, configured without the response instruction data being added to the first vehicle identification data, to be transmitted from an on-vehicle device in the first vehicle, the pseudo response signal transmitter ignores the pseudo call signal on ground that the notation of the first vehicle identification data coincides with a notation of first portable device identification data generated so as to derive from the first identification information, when the pseudo call signal has been received by the first portable device, while interpreting the pseudo call signal as the welcome signal in a pseudo manner on ground that the notation of the first vehicle identification data coincides with a notation of second inverted portable device data having a relationship, in which a logical value of each digit thereof inverts from that of the first portable device identification data, with the first portable device identification data and causing the pseudo response signal to be transmitted from the second portable device, when the pseudo call signal has been received by the second portable device, and the call instruction signal transmitter causes the call instruction signal to be transmitted from the on-vehicle device in the first vehicle with regarding, as the waiting time, a time that elapses before at least transmission of the pseudo response signal is started by the second portable device, after the pseudo call signal has been transmitted from the on-vehicle device in the first vehicle.

7. The keyless entry device for a vehicle according to claim 6, wherein the call instruction signal transmitter causes the call instruction signal to be transmitted from the on-vehicle device in the first vehicle with regarding, as the waiting time, a time that elapses before the transmission of the pseudo response signal is terminated and after the transmission of the pseudo response signal has been started by the second portable device, after the pseudo call signal has been transmitted from the on-vehicle device in the first vehicle.

8. The keyless entry device for a vehicle according to claim 6, wherein the pseudo call signal transmitter causes the next pseudo call signal to be transmitted from the on-vehicle device in the first vehicle at an interval of a waiting time that elapses before initial transmission of the pseudo response signal due to the second portable device is completed, after the pseudo call signal has been initially transmitted from the on-vehicle device in the first vehicle, and the call instruction signal transmitter causes the call instruction signal to be transmitted from the on-vehicle device in the first vehicle with regarding, as the waiting time, a time that elapses before at least transmission of the next pseudo response signal for the next pseudo call signal is started by the second portable device, after each of the initial and next pseudo call signals has been transmitted from the on-vehicle device in the first vehicle.

* * * * *